United States Patent Office 3,485,838
Patented Dec. 23, 1969

3,485,838
PYRIDAZINE DERIVATIVES
Tsutomu Irikura, 72 Shimura-Nakadaimachi, Itabashi-ku, Tokyo, Japan; Shimao Sato, 518 Shimokaizuka-cho, Ichikawa-shi, Chiba-ken, Japan; and Kazunari Shirai, 11 Izumi-cho, Itabashi-ku, Tokyo, Japan
No Drawing. Continuation-in-part of application Ser. No. 359,498, Apr. 13, 1964. This application May 18, 1967, Ser. No. 639,280
Claims priority, application Japan, Apr. 26, 1963, 38/21,891
Int. Cl. C07d 51/04; A61l 23/00
U.S. Cl. 260—250    1 Claim

ABSTRACT OF THE DISCLOSURE

The invention relates to pyridazine derivatives of the formula

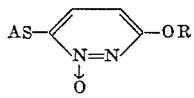

in which A stands for hydrogen or an alkali metal and R represents lower alkyl or phenyl. The pyridazine derivatives of the invention are valuable compounds to be used in chemotherapy, particularly as an effective agent against microorganisms causing favus and similar skin diseases. They are also intermediates in the manufacture of a number of antibacterial and antifungal drugs.

---

The present invention is a continuation-in-part application of Ser. No. 359,498, filed Apr. 13, 1964, now abandoned.

SUMMARY OF THE INVENTION

The invention relates to pyridazine derivatives of the formula

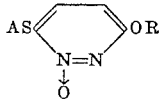

in which A stands for hydrogen or an alkali metal and R represents lower alkyl or phenyl.

Previous studies of the inventors had shown that 3-mercapto-6-chloropyridazine has a relatively strong antibiotic potency. (The Pharmaceutical Magazine of Japan, vol. 82, p. 1085, 1962.) It was further known from a publication in the Journal of the American Chemical Society, vol. 72, page 4362 (1950) that mercapto-pyridine-N-oxide has considerable antibiotic activity.

Starting from these premises, it was the object of the present invention to provide compounds of higher effectiveness and of a wide antibacterial and antifungal spectrum, by a simple and inexpensive manufacturing method.

Other objects and advantages of the invention will become apparent from the following detailed description.

In the following, the method for preparing the compounds of the present invention will be explained in general terms:

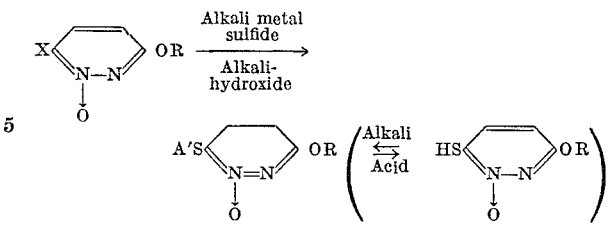

in which X means a halogen, A' stands for an alkali metal and R represents a hydrocarbon radical such as lower alkyl or aryl (phenyl).

Thus, 3-halogeno-6-alkoxy (or aryloxy)-pyridazine-N-oxide can easily be converted into the desired mercapto compound by reacting an alkali hydrosulfide such as KHS and NaHS with the halogen in the 3-position; the resulting alkali salt of 3-mercapto-6-alkoxy (or aryloxy)-pyridazine-N-oxide can, in turn, be converted by acidic reaction into the free 3-mercapto-6-alkoxy (or aryloxy)-pyridazine-N-oxide.

Specific examples of the compounds prepared in accordance with the above course of reaction, namely, 3-mercapto-6-methoxy-pyridazine-N-oxide and 3-mercapto-6-phenoxy-pyridazine-N-oxide are both yellow, crystalline substances, soluble in water. According to tests of the antibiotic effectiveness carried out in vitra, these compounds are effective in inhibiting the growth of fungi causing favus already at a concentration of 1–2γ/cc., which indicates that the compounds of the present invention can be considered as highly valuable therapeutic agents in the treatment of favus and similar skin diseases. It was also found that the above-mentioned alkali metal salts of 3-mercapto-6-methoxy (or phenoxy)-pyridazine-N-oxide will be just as effective in inhibiting the growth of fungi causing favus as the free compounds in spite of their lower water-solubility.

In the following, the method for preparing some derivatives of pyridazine according to the present invention will be more fully explained by way of a few examples but it should be understood that these are given by way of illustration and not of limitation.

Example 1

In 30 cc. of 2 N-solution of potassium hydrosulfide in alcohol we place 3 g. of 3-chloro-6-methoxy-pyridazine-N-oxide, and stir the mixture 3 hours at room temperature. After leaving the solution to stand over night, crystals will have precipitated from the solution which are collected by filtration. They are then dissolved in water and freed from insoluble matter by filtering the solution. When the filtrate is acidified with hydrochloric acid, yellowish brown crystals will precipitate; by recrystallizing the crystals from alcohol, scaly crystals are obtained which again are of a yellowish brown color. Melting point: 140–141° C.

Analysis for $C_5H_6O_2N_2S$.—Calculated: C, 37.97; H, 3.97; N, 17.71. Found: C, 38.43; H, 3.82; N, 17.97.

By dissolving the scaly crystals in a small quantity of water and pouring the solution into an alcoholic solution of caustic potash, the corresponding potassium salt can be obtained which is soluble in water and of a brilliant yellow. Melting point (with decomposition): 320° C. Yield: 23 g., corresponding to 80% of the theory.

Example 2

In 20 cc. of 2 N-solution of potassium hydrosulfide in alcohol we place 2 g. of 3-chloro-6-phenoxypyridazine-N-oxide, and stir the mixture for 3–4 hours at room temperature. After leaving the solution to stand over night, crystals will have precipitated from the solution which are collected by filtration. Then, the filtrate is concentrated under reduced pressure, yellow crystals being thereby obtained. The crystals are collected by filtration, dissolved thereafter in water, and the aqueous solution thus prepared is filtered to remove insoluble matter therefrom. When the filtrate is treated with decolorizing charcoal and acidified with dilute hydrochloric acid, pale yellow crystals will be obtained from the filtrate. By recrystallizing the crystals from alcohol, we obtain faintly yellowish brown crystals amounting to 1.2 g. Yield: 61.3% of the theory. Melting point: 143–145° C.

Analysis for $C_{10}H_8O_2N_2S$.—Calculated: C, 54.54; N, 3.63; N, 12.72. Found: C, 54.90; N, 3.79; N, 12.95.

By dissolving the substance thus obtained in a calculated quantity of alcoholic solution of caustic potash, removing insoluble matter by filtering the resulting solution and concentrating the filtrate, a preparation in the form of the potassium salt is obtained which is readily soluble in water as brillant yellow crystals.

In order to find out the inhibiting activity of the pyridazine derivatives of the present invention, a number of tests were carried out with the compound of the formula

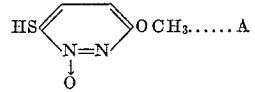

for antifungal as well as antibacterial activities.

The fungi tested were: *Aspergillus niger, Penicillium chrysogenus* 408–701, *Trichophyton interdigitale, Saccharomyces sake,* and *Candida albicans* 3147.

The bacteria were: *Bacillus subtillis* PCI 219, *Staphylococcus aureus* 209P, *Pseudomonas aeruginosa* VI.

(A) *Anti-fungal activity.*—The tests were conducted in a conventional culture medium, which was filled into test tubes and inoculated with the microorganism to be tested. On the first day of the test, each tube received an amount of the compound A, the amount ranging from $0.5\gamma$–$20\gamma$ per milliliter. One test tube remained without addition of compound A for control.

In the following, the results of tests carried out with the above named microorganisms over a six day period are tabulated, beginning with the second and ending with the sixth day. The temperature was 27° C.

*Aspergillus niger*

| Day: | Blank | | 0.5γ | | 1.0γ | | 2.0γ | | 3.0γ | | 5.0γ | | 10γ | | 20/ml. | |
|---|---|---|---|---|---|---|---|---|---|---|---|---|---|---|---|---|
| 2 | +++ | +++ | +++ | +++ | +++ | +++ | ++ | ++ | + | + | + | + | + | + | + | + |
| 3 | +++ | +++ | +++ | +++ | +++ | +++ | +++ | +++ | ++ | ++ | ++ | ++ | ++ | ++ | ++ | +-- |
| 4 | +++ | +++ | +++ | +++ | +++ | +++ | +++ | +++ | +++ | +++ | +++ | +++ | +++ | +++ | +++ | +-- |
| 5 | +++ | +++ | +++ | +++ | +++ | +++ | +++ | +++ | +++ | +++ | +++ | +++ | +++ | +++ | +++ | +-- |
| 6 | +++ | +++ | +++ | +++ | +++ | +++ | +++ | +++ | +++ | +++ | +++ | +++ | +++ | +++ | +++ | +-- |

MIC (minimum inhibitory concentration), >20γ/ml.

*Penicillium chrysogenus 408-701*

| Day: | Blank | | 0.5γ | | 1.0γ | | 2.0γ | | 3.0γ | | 5.0γ | | 10γ | | 20/ml. | |
|---|---|---|---|---|---|---|---|---|---|---|---|---|---|---|---|---|
| 2 | ++ | ++ | ++ | + | ++ | ++ | + | + | + | ± | + | + | + | ± | ± | + |
| 3 | +++ | +++ | ++ | ++ | ++ | ++ | ++ | ++ | ++ | ++ | + | ++ | + | ++ | + | + |
| 4 | +++ | +++ | +++ | +++ | ++ | ++ | ++ | ++ | ++ | ++ | ++ | ++ | ++ | ++ | ++ | +-- |
| 5 | +++ | +++ | +++ | +++ | +++ | +++ | +++ | +++ | +++ | +++ | +++ | +++ | +++ | +++ | +++ | +-- |
| 6 | +++ | +++ | +++ | +++ | +++ | +++ | +++ | +++ | +++ | +++ | +++ | +++ | +++ | +++ | +++ | +-- |

MIC, >20γ/ml.

*Tricho phyton interdigitale*

| Day: | Blank | | 0.5γ | | 1.0γ | | 2.0γ | | 3.0γ | | 5.0γ | | 10γ | | 20/ml. | |
|---|---|---|---|---|---|---|---|---|---|---|---|---|---|---|---|---|
| 2 | – | – | – | – | ± | ± | – | – | – | – | – | – | – | – | – | – |
| 3 | + | + | + | + | ± | ± | – | – | – | – | – | – | – | – | – | – |
| 4 | + | + | + | + | + | + | – | – | – | – | – | – | – | – | – | – |
| 5 | ++ | ++ | ++ | ++ | + | + | – | – | – | – | – | – | – | – | – | – |
| 6 | +++ | +++ | ++ | ++ | + | + | – | – | – | – | – | – | – | – | – | – |

MIC, =2.0γ/ml.

*Saccharomyces Sake*

| Day: | Blank | | 0.5γ | | 1.0γ | | 2.0γ | | 3.0γ | | 5.0γ | | 10γ | | 20/ml. | |
|---|---|---|---|---|---|---|---|---|---|---|---|---|---|---|---|---|
| 2 | ++ | ++ | ± | + | – | – | – | – | – | – | – | – | – | – | – | – |
| 3 | ++ | ++ | + | + | – | – | – | – | – | – | – | – | – | – | – | – |
| 4 | ++ | ++ | + | + | – | – | – | – | – | – | – | – | – | – | – | – |
| 5 | ++ | ++ | + | + | – | – | – | – | – | – | – | – | – | – | – | – |
| 6 | ++ | ++ | + | + | – | – | – | – | – | – | – | – | – | – | – | – |

MIC, =1.0γ/ml.

*Candida Albicans 3147*

| Day: | Blank | | 0.5γ | | 1.0γ | | 2.0γ | | 3.0γ | | 5.0γ | | 10γ | | 20/ml. | |
|---|---|---|---|---|---|---|---|---|---|---|---|---|---|---|---|---|
| 2 | ++ | ++ | – | – | – | – | + | + | ± | ± | ± | ± | ± | + | + | + |
| 3 | ++ | ++ | ++ | ++ | ++ | ++ | + | + | + | + | + | + | + | + | + | + |
| 4 | ++ | ++ | ++ | ++ | ++ | ++ | ++ | ++ | + | + | + | + | + | + | ++ | ++ |
| 5 | ++ | ++ | ++ | ++ | ++ | ++ | ++ | ++ | ++ | ++ | ++ | ++ | ++ | ++ | ++ | ++ |
| 6 | ++ | ++ | ++ | ++ | ++ | ++ | ++ | ++ | ++ | ++ | ++ | ++ | ++ | ++ | ++ | ++ |

MIC, >20γ/ml.

(B) *Antibacterial activity.*—The tests were carried out in the same manner as described above under A, but the period was three days only. The amounts of compound A ranged from 3.0γ/ml. to 20γ/ml. The temperature was 37° C.

Pseudomonas Aeruginosa VI

| | Blank | | 3.0γ | | 5.0γ | | 7.5γ | | 10γ | | 20γ | |
|---|---|---|---|---|---|---|---|---|---|---|---|---|
| 1 | + | + | + | + | + | + | + | + | + | + | + | + |
| 2 | ++ | ++ | ++ | ++ | ++ | ++ | ++ | ++ | ++ | ++ | ++ | ++ |
| 3 | +++ | +++ | +++ | +++ | +++ | +++ | +++ | +++ | +++ | +++ | +++ | +++ |

MIC, >20γ/ml.

Inasmuch as studies have been made previously on the antifungal and antibacterial activities of pyridazine derivatives with nitropyridazines, see Kano et al, U.S. Patent No. 3.185,687, the inventors were interested in comparing the results of their tests with those of Kano et al.

The compound used by the latter authors is 3-methoxy-4-nitro-6-methylpyrazidine-1-oxide of the formula

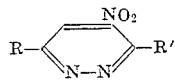

wherein R is lower alkyl and R' is lower alkoxy.

The minimum effective inhibitory concentration of the compound A is tabulated below in comparison with that of the Kano et al. compound. (The Kano compound values are given in parentheses.)

Test organisms: Minimum inhibitory concentration (γ/ml.)
Aspergillus niger (50.5 mcg./ml.) _____ >20
Penicillium chrysogenus 408–701 _____ >20
Trichophyton interdigitale (50.0 mcg./ml.) __ 2
Saccharomyces sake _____ 1
Candida albicans 3147 (100 mcg./ml.) _____ >20
Pseudomonas aeruginosa VI (>50 mcg./ml.) >20

From the above it can be concluded that compound A of the present invention has a significantly more pronounced antibacterial and antifungal effect than the Kano compound.

Tests were further made for determining the toxicity of the compound

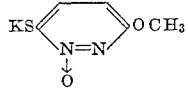

according to this invention.

It was found that the lethal dosage is $LD_{50}$ (rat. by mouth) = 1.28 g./kg.

This shows that the compound B according to the invention has no toxicity as an antifungal or antibacterial agent. A patch test was carried out, in which the present compound was applied on the human skin successively for one week once a day using 0.5% plastic base hydrophilic. The result showed no hypersensitiveness of the skin (negative). This also spells superiority over a nitro-substituted pyridazine compound since it is generally believed that a substance having an $NO_2$ radical as disclosed in Patent No. 3,185,687 has a high degree of toxicity.

Based on the test data recorded above, it is safe to state that the pyridazine derivatives of the present invention have high antifungal and antibacterial activities and no harmful toxic or irritant side effects and that they must be considered as valuable contributions in the field of applied antibiotics.

While specific embodiments of the invention have been shown and described in detail to illustrate the application of the inventive principles, it will be understood that the invention may be embodied otherwise without departing from such principles.

What is claimed is:
1. A mercapto-pyridazine-N-oxide and its alkali metal salts of the formula

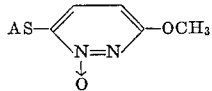

in which A stands for hydrogen or potassium.

References Cited

UNITED STATES PATENTS 3,169,848   2/1965   Gysin et al. _____ 260—250

OTHER REFERENCES

Makagome et al.: J. Pharm. Soc. (Japan), vol. 82, pp. 253–256 (1962).

NICHOLAS S. RIZZO, Primary Examiner

U.S. Cl. X.R.

260—999